United States Patent
Takasawa et al.

(10) Patent No.: US 7,375,919 B2
(45) Date of Patent: May 20, 2008

(54) RECORDING AND REPRODUCING APPARATUS

(75) Inventors: Takeharu Takasawa, Kanagawa (JP); Sunao Kushiro, Chiba (JP); Hiroshi Fujii, Tokyo (JP); Kentaro Shingai, Tokyo (JP); Takahiro Fukutani, Kanagawa (JP); Norio Ito, Kanagawa (JP)

(73) Assignee: Sony Corporation (JP)

( * ) Notice: Subject to any disclaimer, the term of this patent is extended or adjusted under 35 U.S.C. 154(b) by 273 days.

(21) Appl. No.: 10/539,523

(22) PCT Filed: Dec. 18, 2003

(86) PCT No.: PCT/JP03/16246

§ 371 (c)(1),
(2), (4) Date: Jun. 17, 2005

(87) PCT Pub. No.: WO2004/061838

PCT Pub. Date: Jul. 22, 2004

(65) Prior Publication Data

US 2006/0192837 A1     Aug. 31, 2006

(30) Foreign Application Priority Data

Jan. 6, 2003     (JP)     .......................... P2003-000477

(51) Int. Cl.
*G11B 15/28*     (2006.01)

(52) U.S. Cl. ........................................ 360/85; 360/96.1

(58) Field of Classification Search .................. 360/95, 360/85, 96.1, 96.3; 242/336, 338–338.3, 242/343–343.2

See application file for complete search history.

(56) References Cited

U.S. PATENT DOCUMENTS

| | | | | |
|---|---|---|---|---|
| 5,126,909 A | * | 6/1992 | Mototake et al. | 360/137 |
| 5,153,790 A | * | 10/1992 | Kobayashi et al. | 360/85 |
| 5,159,506 A | * | 10/1992 | Eino et al. | 360/85 |
| 5,305,162 A | * | 4/1994 | Kushiro et al. | 360/85 |
| 5,459,626 A | * | 10/1995 | Lee et al. | 360/85 |
| 5,650,888 A | * | 7/1997 | Kuwajima | 360/85 |
| 5,699,208 A | * | 12/1997 | Kim et al. | 360/85 |
| 5,825,583 A | * | 10/1998 | Kang et al. | 360/85 |
| 5,901,011 A | * | 5/1999 | Chae et al. | 360/85 |
| 5,992,781 A | * | 11/1999 | Suzuki et al. | 242/336 |
| 6,095,447 A | * | 8/2000 | Tsunekawa | 242/343.1 |
| 6,215,612 B1 | * | 4/2001 | Saito et al. | 360/96.4 |

FOREIGN PATENT DOCUMENTS

| | | |
|---|---|---|
| JP | 04-248157 A | 9/1992 |
| JP | 04-316725 A | 11/1992 |

(Continued)

*Primary Examiner*—Brian E. Miller
*Assistant Examiner*—Matthew G. Kayrish
(74) *Attorney, Agent, or Firm*—Lerner, David, Littenberg, Krumholz & Mentlik, LLP

(57) ABSTRACT

The dimension in the height direction of a reel braking mechanism to be disposed on the side of an S-side reel table in a video tape recorder is made small while making it difficult to disassemble an assembled state. The dimension in an axis line direction of a pin that engages an elongated hole of a brake member of a brake arm is lengthened, thereby penetrating the brake member and extending downward. The extended portion of the pin is made to pass through a cut formed in an edge of a slide chassis.

14 Claims, 15 Drawing Sheets

FOREIGN PATENT DOCUMENTS

| | | |
|---|---|---|
| JP | 6-52599 A | 2/1994 |
| JP | 7-296458 A | 11/1995 |
| JP | 2531251 A | 6/1996 |
| JP | 9-63161 A | 3/1997 |
| JP | 2948997 A | 7/1999 |
| JP | 3039425 A | 3/2000 |
| JP | 3071054 A | 5/2000 |
| JP | 2002-208197 A | 7/2002 |

* cited by examiner

RECORDING AND REPRODUCING APPARATUS

TECHNICAL FIELD

The present invention relates to a recording and reproducing apparatus, and more particularly to a recording and reproducing apparatus in which a tape-shaped recording medium is helically wound around a head drum and the tape-shaped recording medium is helically scanned by a rotating head to perform recording and/or reproducing in conformity with the helical scanning system.

BACKGROUND ART

A video tape recorder (VTR) is made to perform recording and/or reproducing in conformity with the helical scanning system such that a head drum composed of a fixed drum and a rotating drum is helically wound with a magnetic tape on the periphery of the head drum to make the magnetic tape run at a constant speed by a capstan, and helically scans the magnetic tape by a magnetic head provided on the rotating drum to. That is, while the magnetic head performs scanning on a diagonal track to the length direction of the magnetic tape, the writing of a signal or the reading of a signal is performed.

Such a VTR is equipped with a supply-side reel table and a take-up side reel table which engage with a supply-side reel for reeling out the magnetic tape and a take-up side reel for taking up the magnetic tape, respectively. Here, each reel table is equipped with corresponding braking means, and performs a braking operation as the need arises, whereby each reel table gives aback tension to the magnetic tape, or blocks an unexpected rotation of the reels to prevents the looseness of the magnetic tape.

A reel brake provided on the supply-side reel table is suitable to perform the on-off operation of the brake in the state where the brake arm thereof is held at the same position. In order to express such a function, it is necessary to mount a brake member on the brake arm, and to make the brake member perform a moving operation between an active position and an inactive position against the brake arm. Moreover, the brake structure composed of a plurality of components including the brake member and the brake arm is needed to be small in shape, and in particular it is preferable to assemble the brake structure to be small in size in the axis line direction of the reel table. On the other hand, in the case where such a brake structure is combined as an assembly, the assembly should be a structure difficult to disassemble. That is, although making to be thin and difficult to disassemble contradicts each other, a braking device having a structure of being thin and difficult to disassemble the assembled state is required.

Moreover, the VTR composed of the magnetic recording and reproducing apparatus using the rotating head drum has the structure in which the magnetic tape is pulled out from a tape cassette to be helically wound around the rotating head drum, and the magnetic tape is made to travel in this state. Hereupon, with the aim of lessening the size in the depth direction, namely the loading direction of the magnetic tape, of the mechanical section of the magnetic recording and reproducing apparatus, the VTR adopts the structure such that the pair of reel tables on which the tape cassette is loaded is mounted on a slide chassis, the tape cassette is made to move in the direction of approaching the rotating drum at the time of loading, and a part of the rotating head drum is made to enter a concave pocket portion formed in the front part of the tape cassette.

In this kind of magnetic recording and reproducing apparatus, since the magnetic tape is pulled out from the inside of the tape cassette while performing the linear skate of the slide chassis, the take-up side reel table is rotated, which holds the reel of the tape cassette wound with the magnetic tape to be pulled out at the time of the pulling out of the magnetic tape. Therefore, in the VTR provided with a braking mechanism turning on and off the braking thereof according to the rotation direction of the take-up side reel table, it is necessary to coercively turn off the brake during the linear skate to remove the limiter resistance of the magnet clutch of the braking mechanism for making the brake free at the time of the completion of the linear skate of the slide chassis. Accordingly, in the case of providing the braking mechanism which switches according to the rotation direction of the reel as mentioned above in the take-up side reel table, a release mechanism making the brake free at the time of the completion of the linear skate is disposed on the main chassis. However, in the case of using such release mechanism, a mechanism performing the coercive release over the distance in which a slide chassis performs a minimum linear skating must be disposed, and the miniaturization of the mechanism section is prevented by such release mechanism.

The present invention is devised in view of such a problem. It is an object of the present invention to provide a recording and reproducing apparatus including a braking mechanism which is thin in the axis line directions of reel tables and is also difficult to disassemble an assembled state, or a braking mechanism including release means which does not prevent the miniaturization of the apparatus.

DISCLOSURE OF THE INVENTION

The main invention of the present application is a recording and reproducing apparatus performing recording and/or reproducing in conformity with a helical scanning system, by helically winding a tape-shaped recording medium around a head drum and by helically scanning the tape-shaped recording medium with a rotating head, characterized in that: a brake arm is disposed in proximity to a supply-side reel table with which a supply-side reel reeling out the tape-shaped recording medium engages; a brake member is attached on the brake arm to be swingable and in a state where a swinging center thereof is movable, the brake member is urged by an urge member incorporated on the brake arm in a releasing direction; and when the supply-side reel table is driven to rotate in a direction taking up the tape-shaped recording medium, the brake member moves the center thereof to separates from the supply-side reel table by the urge member to release a brake.

Here, it is preferable that the brake member moves in the releasing direction when the supply-side reel table is driven to rotate in the taking-up direction in a sate where the brake arm is located at an active position and the supply-side reel table receives a braking force by the braking member. Moreover, it is preferable that the brake member moves in the releasing direction when the supply-side reel table is driven to rotate by a minute angle in the taking-up direction at a time of starting to load the tape-shaped recording medium on the head drum in a state where the tape-shaped recording medium is not taken up by a take-up side reel engaging with a take-up side reel table. Moreover, it is suitable that the brake arm is mounted together with the supply-side reel table and the take-up side reel table on a slide chassis capable of approaching the head drum and separating from the head drum, and that a pin supporting the brake member on the brake arm is located in a cut or an opening of the slide chassis. Moreover, it is preferable that the pin supporting the brake member is received in a concave cut formed on an edge of the slide chassis on a side opposite to the head drum.

Another main invention of the present application is a recording and reproducing apparatus performing recording and/or reproducing in conformity with a helical scanning system, by helically winding a tape-shaped recording medium around a head drum and by helically scanning the tape-shaped recording medium with a rotating head, characterized in that: a supply-side reel table and a take-up side reel table, with which a supply-side reel reeling out the tape-shaped recording medium and a take-up side reel taking up the tape-shaped recording medium engage, respectively, are mounted on a slide chassis capable of approaching the head drum and separating from the head drum; a brake lever is disposed in proximity to the take-up side reel table, with which the take-up side reel taking up the tape-shaped recording medium engages, the brake lever releasing braking when the reel table rotates in a take-up direction and performing an braking operation when the reel table rotates in an opposite direction to the taking-up direction; restricting means for restricting the brake lever in an inactive state is provided on the slide chassis, a release member is provided on a main chassis, on which the head drum is mounted, and restriction of the brake lever by the restricting means is released by the release member when the slide chassis moves to a head drum side.

Here, it is preferable that the take-up side reel table is provided with a magnet clutch and a gear, and that the brake lever brakes the reel table through the magnet clutch when the brake lever engages with the gear. Moreover, a brake gear engaging with the gear of the reel table is preferably provided, the brake gear and the brake lever preferably engage with each other with friction, a rotation of the reel table is preferably transmitted to the brake lever through the gear and the brake gear, and braking and releasing of the brake lever are preferably performed according to a rotation direction of the reel table. Moreover, the brake lever and the brake gear are suitably mounted on the slide chassis through a brake holder, and the brake holder suitably abuts against the release member on the main chassis to release the restriction of the brake lever by the restricting means when the slide chassis moves to the head drum side. Moreover, it is preferable that the brake lever is urged in a direction in which the brake lever is turned to be in the inactive state by the restricting means through the brake holder, and that the release member swings the brake holder in the releasing direction against the restricting means. Moreover, it is suitable that the restricting means is a helical spring supported by a supporting member on the slide chassis, and that the brake lever is urged to swing in the direction to be inactive state by a free end of the helical spring.

A further main invention of the present application is a recording and reproducing apparatus performing recording and/or reproducing in conformity with a helical scanning system, by helically winding a tape-shaped recording medium around a head drum and by helically scanning the tape-shaped recording medium with a rotating head, characterized in that: a tape cassette wound with the tape-shaped recording medium therein is moved in a direction of approaching the head drum by a slide chassis to perform the recording and/or the reproducing by the tape-shaped recording medium pulled out from the tape cassette; a reel brake braking a reel wound with the tape-shaped recording medium in the tape cassette is provided, the reel brake performing a braking operation when pulling out the tape-shaped recording medium from the reel, the reel brake releasing the braking operation when taking up the tape-shaped recording medium; restricting means for restricting the reel brake by coercively releasing the reel brake during a movement of the slide chassis equipped with the tape cassette is provided on the slide chassis; and release means for releasing restriction by the restricting means when the slide chassis equipped with the tape cassette moves to a head drum side is provided on a main chassis mounted with the head drum.

Here, it is desirable that the reel brake performs the braking operation and the release thereof according to a rotation direction of the reel. Moreover, it is suitable for the reel brake to be disposed in proximity to a take-up side reel table.

A preferable aspect of the invention included in the present application is a brake structure of a magnetic recording and reproducing apparatus, which is composed of a plurality of components. In the brake structure, in the case where the components are assembled with bosses or pins and holes, each of the bosses or the pins has a size longer than the thickness of each component combined with the holes, and projection portions of the bosses and the pins are relieved by a cut, an opening and the like formed on the chassis, thereby making the brake structure to evade the easiness of disassembling.

Such a brake structure is suitable for being used as a reel brake disposed around the supply-side reel table of the magnetic recording and reproducing apparatus especially, and a structure can be provided in which the brake arm is set at the same position and the brake member mounted on the brake arm is switched to enable the turning on and off of the brake even if the brake arm is located at the same position. In addition, by such a structure, even in a set shaped to be thin and miniaturized, the easiness of the disassembling of the brake is settled, and the assembly of the brake can be performed stably.

Another preferable aspect of the invention included in the preset application is a magnetic recording and reproducing apparatus mounting a braking device thereon. In the state where a pair of reel tables is mounted on a slide chassis and a tape cassette is attached, the slide chassis is moved to the head drum side, and the braking device is turned on and off according to the rotation direction of the reel tables holding the reels of the tape cassette. In such a recording apparatus, a mechanism coercively releasing the brake when the tape cassette is moved together with the slide chassis is mounted on the slide chassis, and a mechanism releasing the restriction of the brake to be free at the time of the completion of the movement of the slide chassis, namely the time of the completion of the linear skate, is disposed on a mechanical chassis.

In a magnetic recording and reproducing apparatus having a structure in which a tape cassette is attached on a slide chassis and the slide chassis is moved to the head drum side at loading, the pulling-in and the sending of the magnetic tape at the time of the movement of the magnetic tape in an approaching direction and a separating direction against the head drum of the slide chassis are principally performed by the take-up side reel engaging with the take-up side reel table. Consequently, since the magnetic tape is pulled out from the take-up reel at the time of the loading of the magnetic tape, it is necessary to release the brake of the take-up side reel table. Moreover, in the case where the magnetic tape is rolled into the tape cassette at the time of unloading, the magnetic tape must be taken up by the take-up side reel. At this time, since the rotation direction is a positive direction, the brake should be set not to activate.

In the magnetic recording and reproducing apparatus of the aspect described above, especially by disposing the restriction mechanism of the brake is disposed on the slide chassis, and by disposing the mechanism for performing the release of the restriction on the main chassis-side, it becomes possible to form a small-sized brake structure independent of a moving stroke or a moving amount of the slide chassis.

BEST MODE FOR CARRYING OUT THE INVENTION (1) Configuration of Whole VTR

Figure 1:
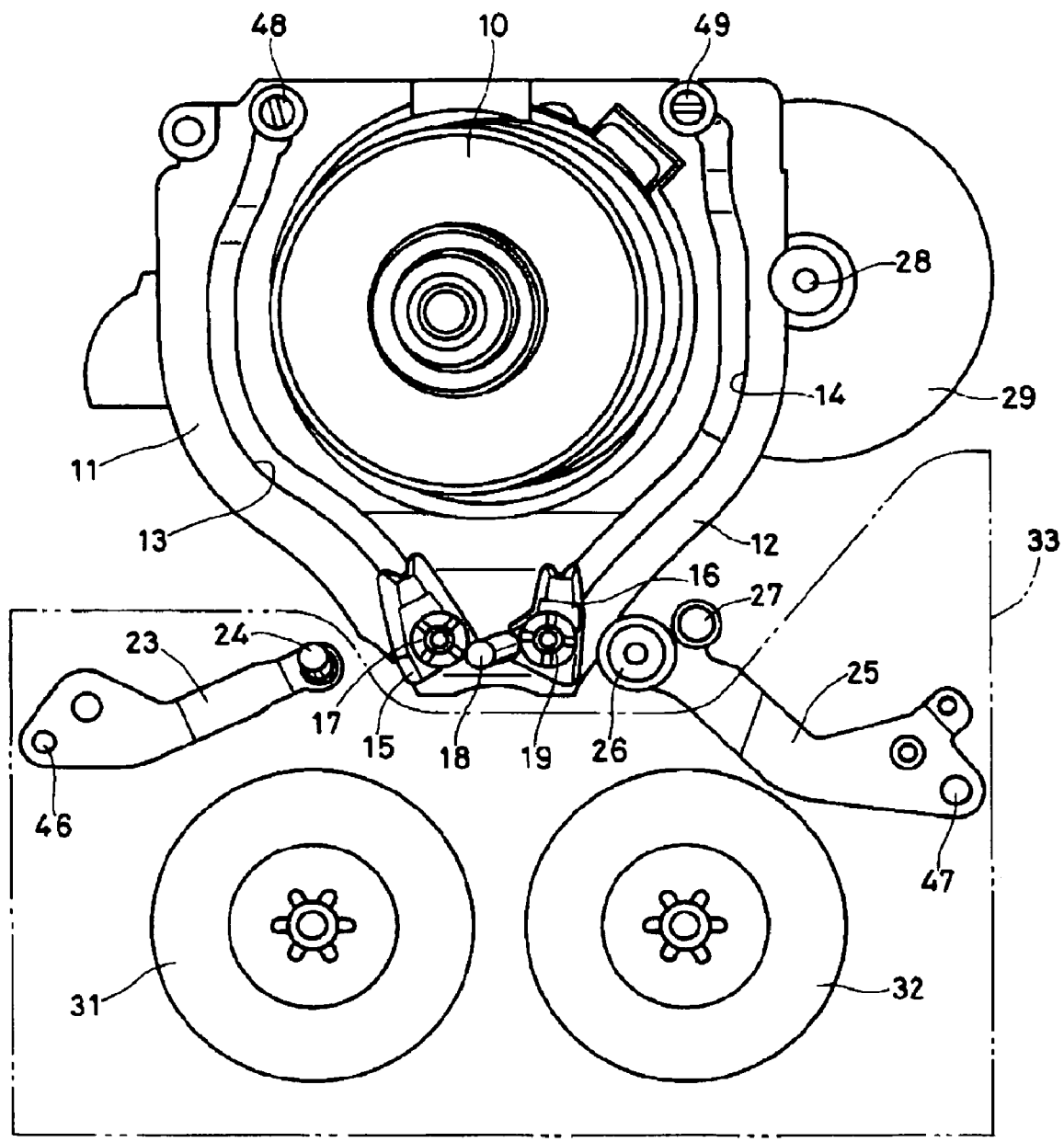
FIG. 1 is a plan view of the main part of a VTR.

FIG. 1 shows an outline of the whole VTR according to an embodiment of the invention of the present application. On a mechanical substrate, the illustration of which is omitted, a head drum 10 composed of a rotating drum and a fixed drum are arranged. A guide plate 11 on a supply-side (hereinafter simply referred to as an S-side) and a guide plate 12 on a take-up side (hereinafter simply referred to as a T-side) are disposed on the both of the left-side and the right-side of the head drum 10, respectively. Guide grooves 13 and 14 are formed in these guide plates 11 and 12, respectively, and coasters 15 and 16 are disposed in a state capable of freely moving along these guide grooves 13 and 14, respectively. A tape guide 17 is disposed in a standing state on the S-side coaster 15, and tape guides 18 and 19 are disposed in a standing state on the T-side coaster 16.

A pull-out lever 23 is disposed diagonally to the S-side guide plate 11, and a tape guide 24 is disposed in a standing state at the tip portion of the pull-out lever 23. On the other hand, a T-side pull-out lever 25 is disposed diagonally to the T-side guide plate 12, and a pinch roller 26 and a tape guide 27 are mounted on the pull-out lever 25. It is to be noted that the pull-out levers 23 and 25 are made to be able to swing freely centered around fulcrum pins 46 and 47, respectively. Moreover, a capstan 28 is disposed on the side of the T-side guide plate 12 so that the pinch roller 26 is to be contacted with a pressure. The capstan 28 is configured to be driven to rotate at a constant speed by a capstan motor 29.

An S-side reel table 31 and a T-side reel table 32 are disposed diagonally to the pull-out levers 23 and 25 of the left and the right-sides, respectively. It is to be noted that the reel tables 31 and 32 and the pull-out levers 23 and 25 are mounted on a slide chassis 33 capable of moving freely on the mechanical substrate in the vertical direction in FIG. 1.

Figure 2:
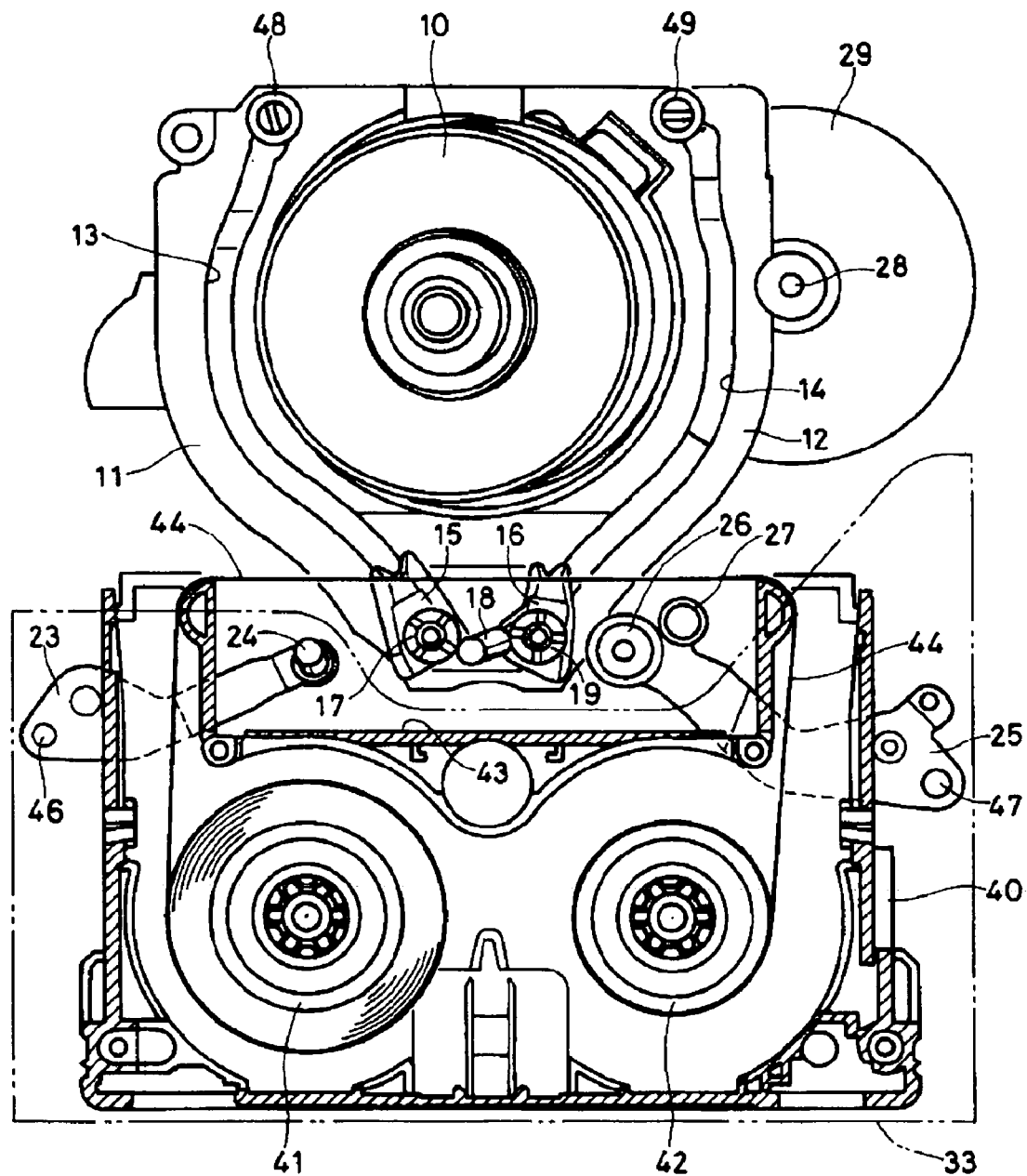
FIG. 2 is a plan view of a state where a tape cassette is attached on the VTR.

In such a VTR, a tape cassette 40 is attached on the reel tables 31 and 32 on the slide chassis 33, as shown in FIG. 2. The tape cassette 40 is equipped with an S-side reel 41 and a T-side reel 42, and a magnetic tape 44 is wound in the state where the both ends thereof are attached to the reels 41 and 42 so as to be immovable. Moreover, the tape cassette 40 is a housing of the reels 41 and 42, and is configured to form a cut 43 at a front-side portion of the housing in order that the tape guides 24, 17, 18, 19 and 27 and the pinch roller 26 enter a concave portion formed by the cut 43.

Figure 3:
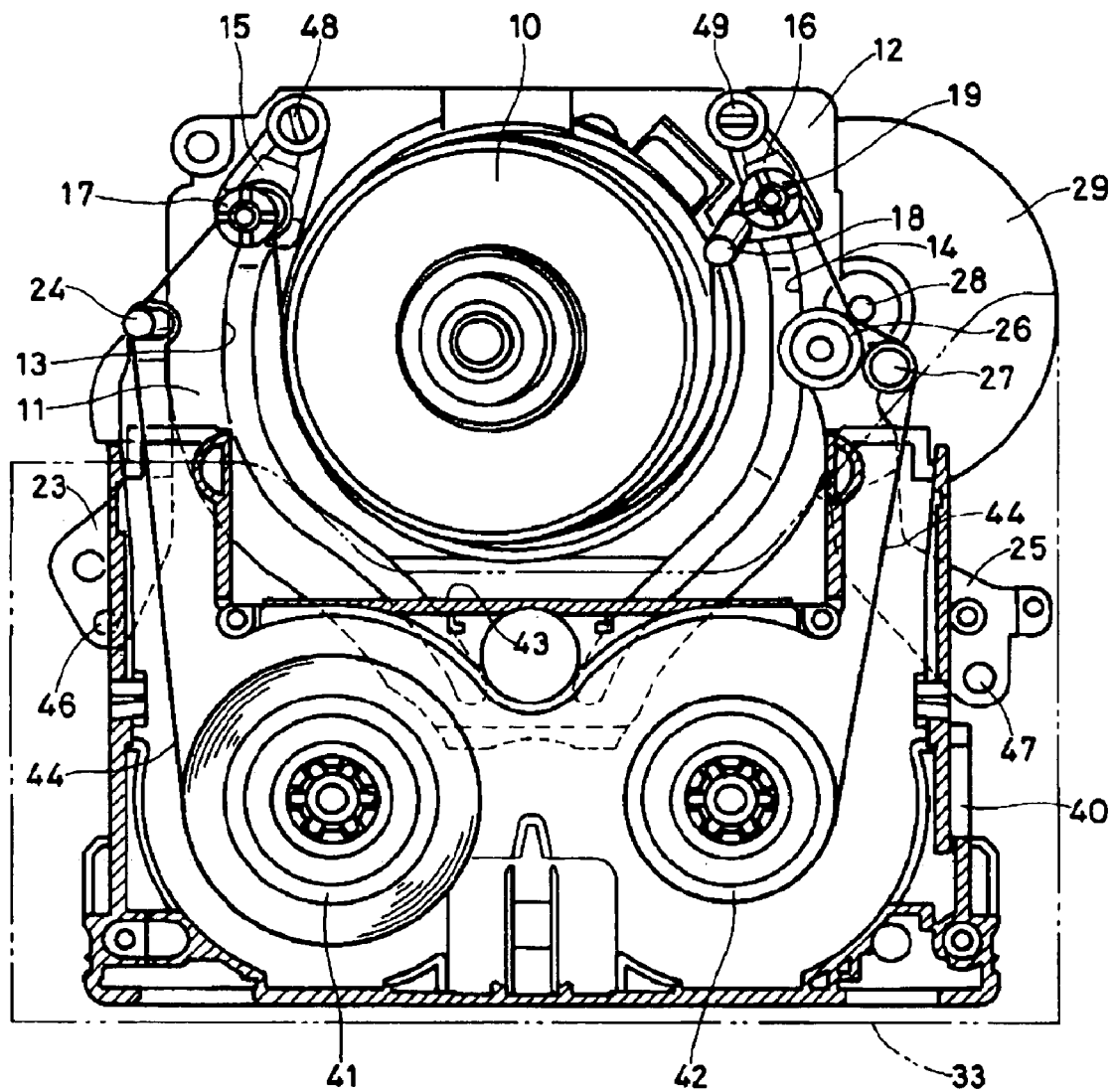
FIG. 3 is a plan view of a state where loading of the magnetic tape is performed.

FIG. 3 shows guide means of the magnetic tape 44 when the magnetic tape 44 in the tape cassette 40 is mounted on the head drum 10. When the magnetic tape 44 is helically wound around the head drum 10 and normal recording and reproducing are performed, the magnetic tape 44 pulled out from the S-side reel 41 is guided by the tape guides 24, 17, 18, and 19, the capstan 28 and the tape guide 27, respectively. In such a state, the pinch roller 26 performs constant speed running at the same speed of the circumferential speed of the capstan 28 in order that the pinch roller 26 presses the magnetic tape to the capstan 28.

(2) Braking Mechanism of S-Side Reel Table 31

Figure 4:
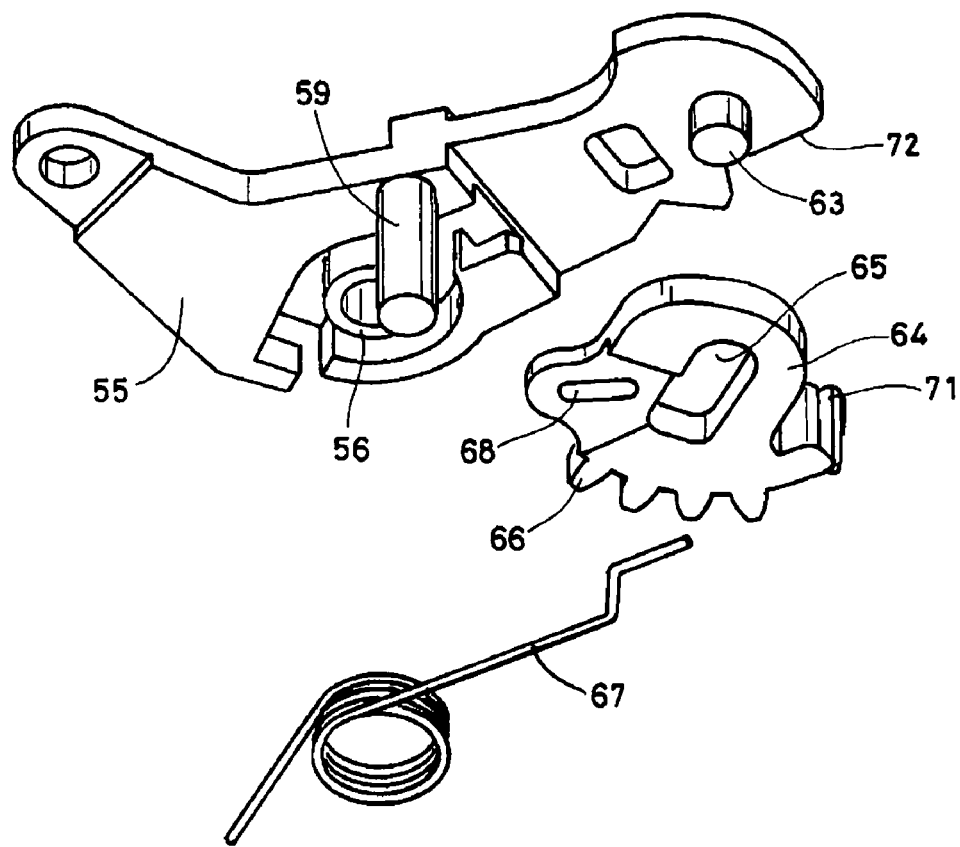
FIG. 4 is an exploded perspective view of the main part of an S-side reel braking mechanism.
Figure 5:
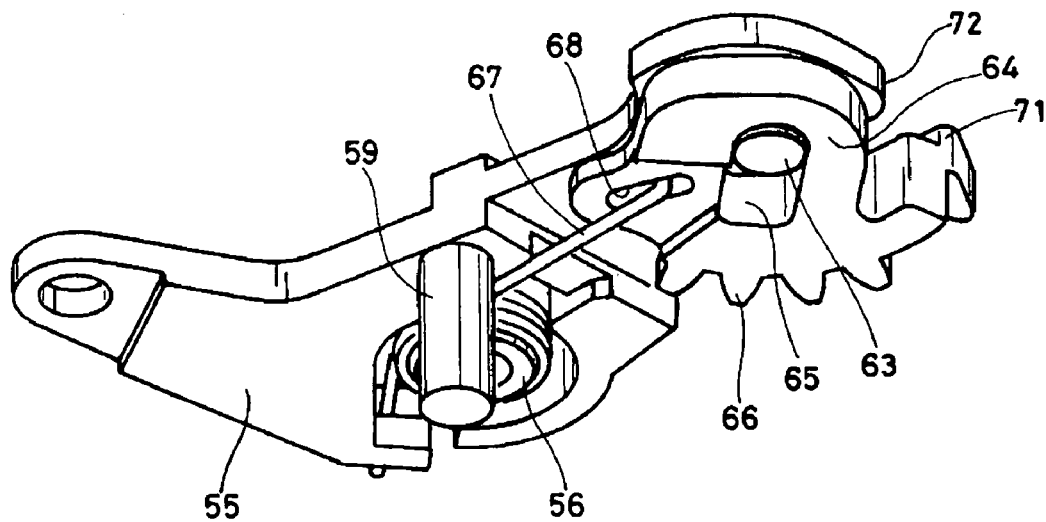
FIG. 5 is an assembly perspective view of the braking mechanism.

Next, a braking mechanism disposed around the S-side reel table 31 provided on the slide chassis 33 will be described with reference to FIGS. 4-7. The braking mechanism is composed of a brake arm 55, a brake member 64 and a helical spring 67, as shown in FIGS. 4 and 5. A tubular boss 56 is provided in a protruding state at a fulcrum position of the brake arm 55, and the tubular boss 56 is supported capable of swinging by a pin 58 on the slide chassis 33. Moreover, on the brake arm 55, a release pin 59 is provided in a protruding state at the side part of the boss 56, and the release pin 59 penetrates the slide chassis 33 and the main chassis 57 to extend downward. An opening 60 is formed in the slide chassis 33 in order to let the release pin 59 out. Moreover, the brake arm 55 is urged to swing counterclockwise centered around the pin 58 by a coil spring 61 in FIG. 7.

On the brake arm 55, the brake member 64 is assembled with a pin 63 provided on the tip side of the brake arm 55. The brake member 64 includes a long hole 65 at almost the central part thereof, and the long hole 65 receives the pin 63. Then, teeth 66 formed on the brake member 64 are made to engage with a gear 69 on the side of the S-side reel table 31.

Figure 10:
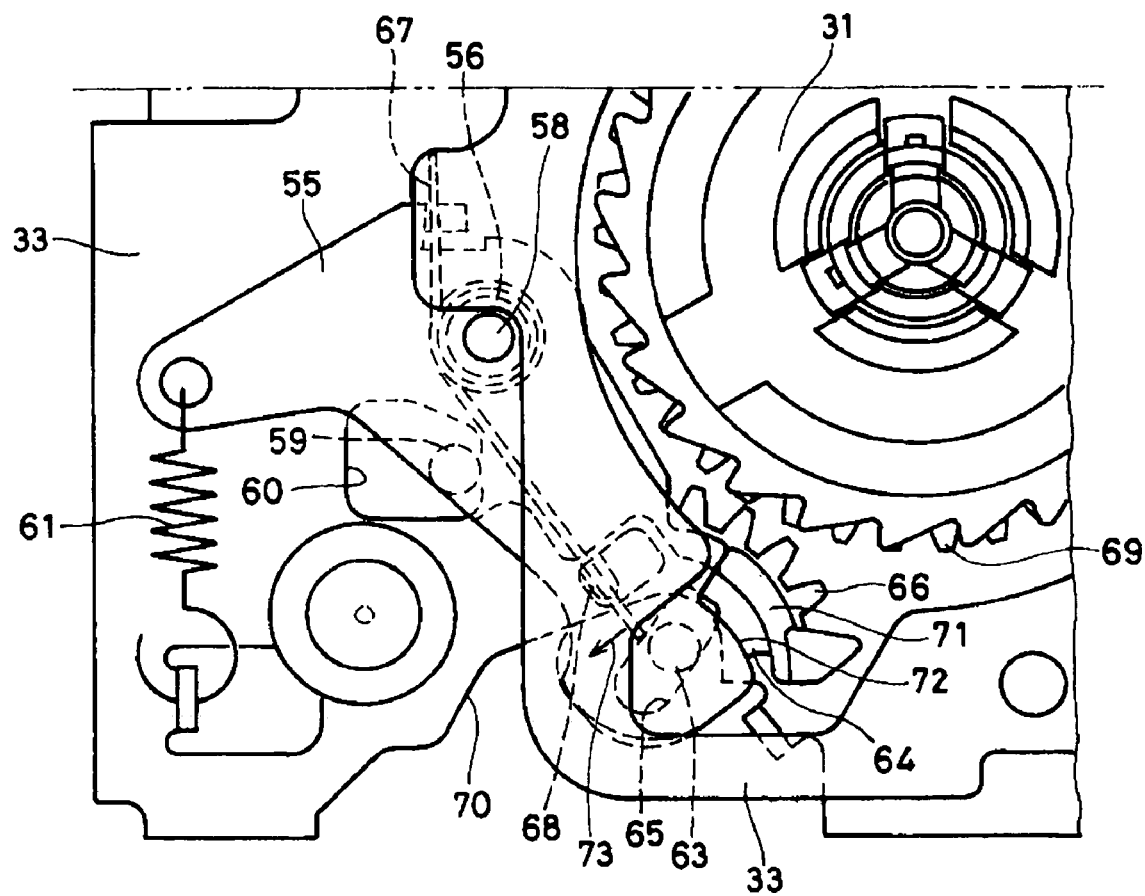
FIG. 10 is a plan view showing the operation of the S-side braking mechanism.

The helical spring 67 is wound around the boss 56 of the brake arm 55, and the portion on the tip side of the helical spring 67 is crooked in the shape of a crank to engage with a latch hole 68 of the brake member 64. Thereby, the helical spring 67 urges the brake member 64 in the direction to break away from the gear 69. The brake member 64 is made to move in the direction (the direction of an arrow 73 in FIG. 10) of separating from the reel table 31 by an urging force of the helical spring 67 when a projection 71 provided on the brake member 64 falls in a step portion 72 of the brake arm 55.

(3) Braking Mechanism of T-Side Reel Table 32

Next, a brake structure on the side part of the T-side reel table 32 provided on the slide chassis 33 will be described with reference to FIGS. 12 and 13. The T-side reel table 32 is equipped with a gear 80 in a downside portion thereof, and the reel table 32 is mounted on the gear 80 through a magnet clutch 81.

A brake gear 82 is supported by a pin 86 in the side part of the reel table 32 so that the brake gear 82 engages with the gear 80 of the reel table 32. A brake lever 83 having a U-shape cross section is combined with the brake gear 82 so that the brake lever 83 sandwiches the brake gear 82 from the upper and the lower sides. The brake lever 83 is equipped with a projecting piece 84. When the projecting piece 84 engages with the gear 80, the braking of the T-side reel table 32 is performed. A brake holder 85 for mounting the brake lever 83 and the brake gear 82 is provided, and the brake lever 83 and the brake gear 82 are disposed in a standing state by the pin 86 implanted on the brake holder 85.

Figure 17:
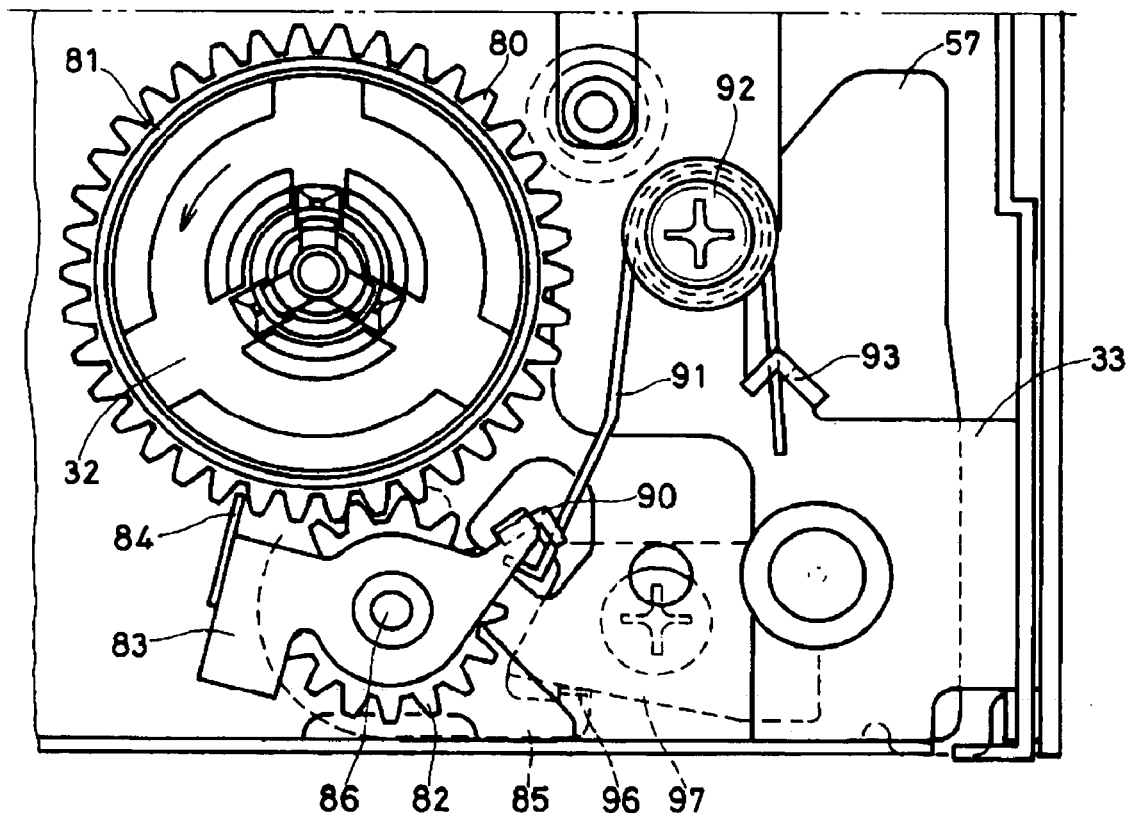
FIG. 17 is a plan view of the main part showing the operation of the T-side braking mechanism.

Moreover, a latch piece 90 is provided at one end of the brake holder 85, and the latch piece 90 latches an end of a helical spring 91. The helical spring 91 is held in the state of being wound around a boss 92 on the slide chassis 33, and the other end side of the helical spring 91 is latched by a latch portion 93 on the slide chassis 33. Moreover, a bent piece 96 is formed on the brake holder 85. A release operation as shown in FIG. 17 is made to be performed when the bent piece 96 abuts against a release member 97 on the main chassis 57.

(4) Operation of Whole VTR

Next, the operation of the VTR configured as above will be described. In a state where the slide chassis 33 is separated from the head drum 10 as shown in FIG. 1, the tape cassette 40 is attached, and the reels 41 and 42 thereof are engaged with the reel tables 31 and 32 on the slide chassis 33, respectively, as shown in FIG. 2. Since the magnetic tape 40 is suspended so as to cross the cut 43 of the tape cassette 40 at this time, the tape guide 24 on the pull-out lever 23, the tape guide 17 on the coaster 15, the tape guides 18 and 19 on the coaster 16, and the pinch roller 26 and the tape guide 27 on the pull-out lever 25 severally enter the space between the magnetic tape 44 and the cut 43.

In the state described above, the slide chassis 33 performs a slide operation in the direction of approaching the head drum 10. Moreover, the pull-out levers 23 and 25 on the left and the right-sides, respectively, swing in the counterclockwise direction and the clockwise direction centered around the fulcrum pins 46 and 47 almost simultaneously, respectively. Moreover, the S-side coaster 15 and the T-side coaster 16 move along the left-hand side and the right-hand side of the head drum 10 along the guide grooves 13 and 14 of the guide plates 11 and 12, respectively. It is to be noted that the positions and the postures of the coasters 15 and 16 are regulated and stopped in the state where the coasters 15 and 16 abut against bumping guides 48 and 49 located at the terminuses of the guide grooves 13 and 14, respectively.

When the tape loading has been completed in such a way, the magnetic tape 44 is helically wound around the peripheral surface of the head drum 10 in the state of being guided by the tape guides 24, 17, 18 and 19, the capstan 28 and the tape guide 27, as shown in FIG. 3.

In the state where the magnetic tape 44 is helically wound around the peripheral surface of the head drum 10 in such a way, the head drum 10 rotates, for example, at 100 rotations per second (6000 rpm), and the magnetic tape 44 is attached to the capstan 28 by the pressure of the pinch roller 26, whereby the magnetic tape 44 runs at the same speed as the circumferential speed of the capstan 28. At this time, the magnetic tape 44 is reeled out from the S-side reel 41 of the tape cassette 44, and is taken up by the T-side reel 42.

Here, in particular, the VTR of the present embodiment is configured to perform a reproducing operation in conformity with the double scanning method which reproduces one track twice and synthesizes reproduction outputs, and thereby the width of a track on the magnetic tape 44 is narrowed. For example, writing a signal in the track having a width of 5 µm is realized.

(5) Operation of Braking Mechanism of S-Side Reel Table 31

Next, a brake operation of the S-side reel table 31 will be described. When the mode of the VTR is switched to a record mode or a reproducing mode in the state where the magnetic tape 44 in the tape cassette 40 has been wound around the head drum 10 and loading is completed, the release pin 59 is pressed with an operating member, which is not shown, and the brake arm 55 moves to a swung position shown in FIG. 7 by it. In this state, since the teeth 66 of the brake member 64 on the brake arm 55 has intermeshed with the gear 69 on the downside of the reel table 31, a braking operation is generated when the reel table 31 is rotating in the clockwise direction. That is, the gear 69 cannot rotate because the gear 69 engages with the teeth 66 of the brake member 64, and consequently the reel table 31 receives a braking force from the magnetic clutch intervening between the reel table 31 and the gear 69. Thereby, the magnetic tape 44 reeled out from the S-side reel 41 generates a slight back tension.

Figure 8:
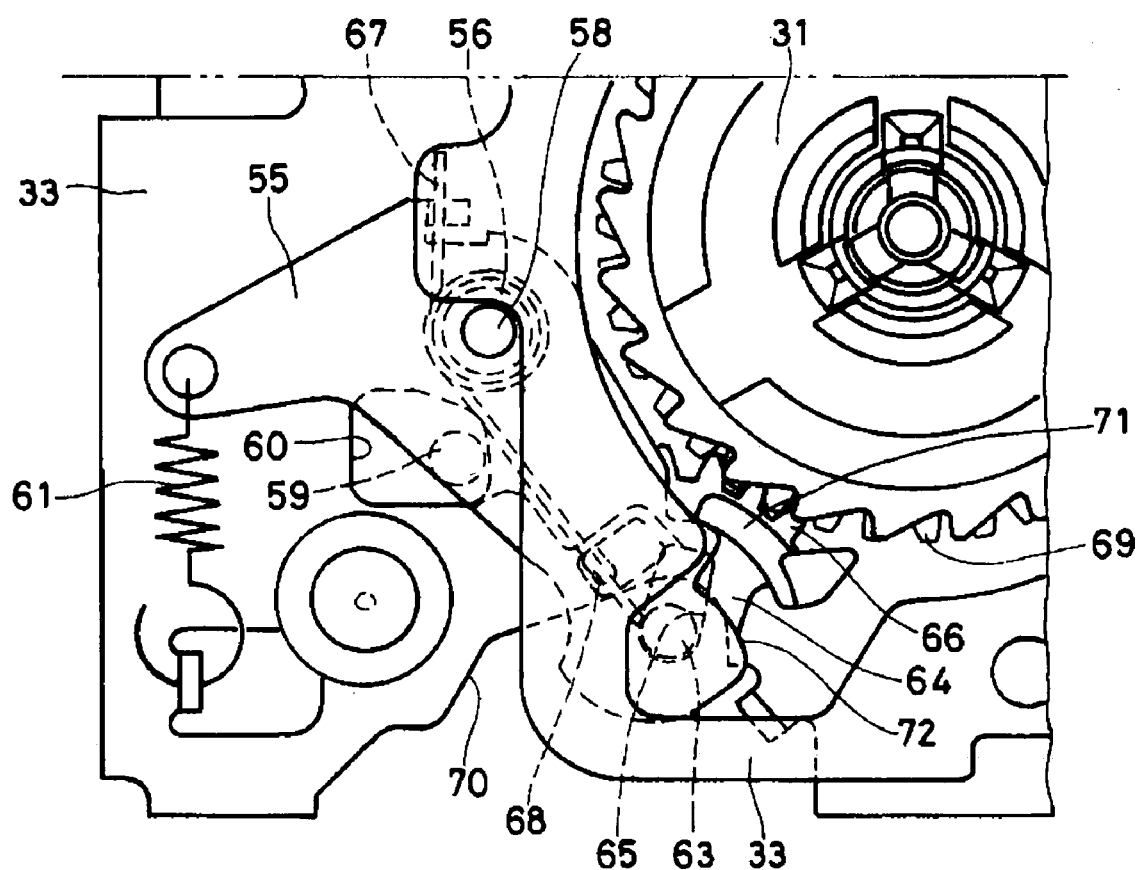
FIG. 8 is a plan view showing an operation of the S-side braking mechanism.

On the other hand, when the S-side reel table 31 is swung counterclockwise, the brake of the S-side reel table 31 is released by operations shown in FIGS. 8-11. The operations are performed by making the reel table 31 swing counterclockwise. Namely, as shown in FIG. 8, when the reel table 31 is swung counterclockwise, the gear 69 is also swung in the same direction through the magnet clutch. Therefore the brake member 64 having the teeth 66 engaging with the gear 69 is clockwise swung centered around the pin 63.

Figure 9:
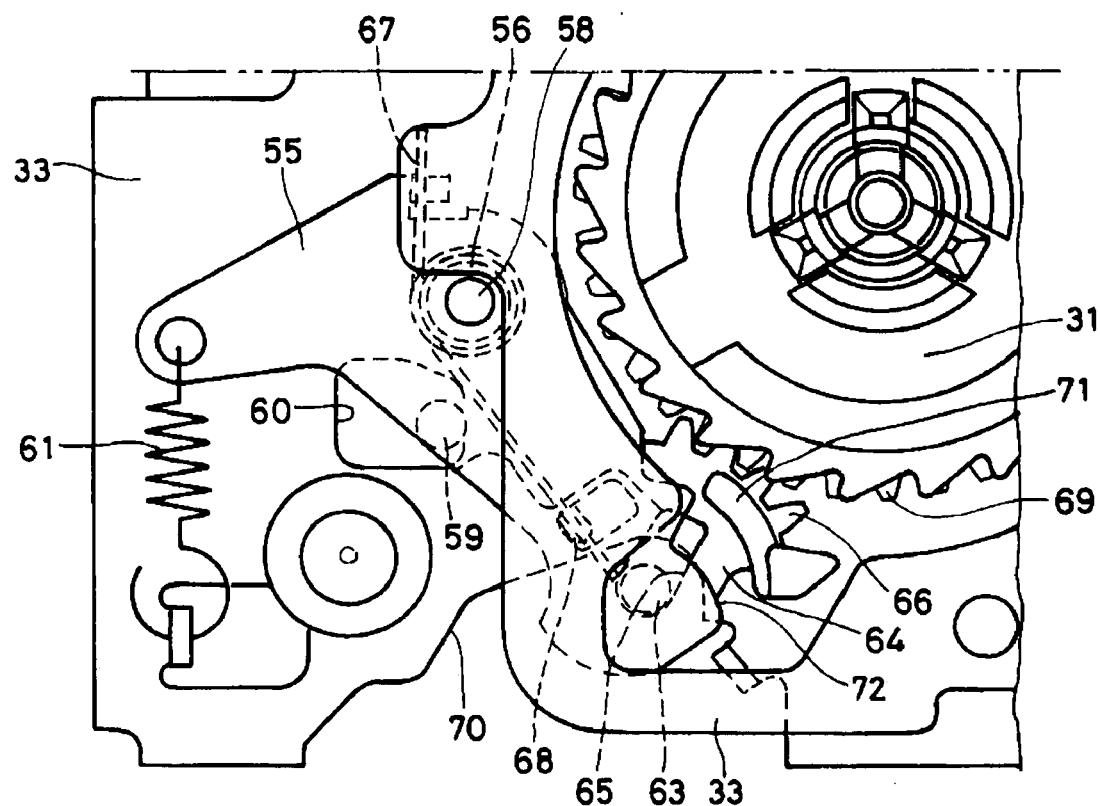
FIG. 9 is a plan view showing the operation of the S-side braking mechanism.
Figure 11:
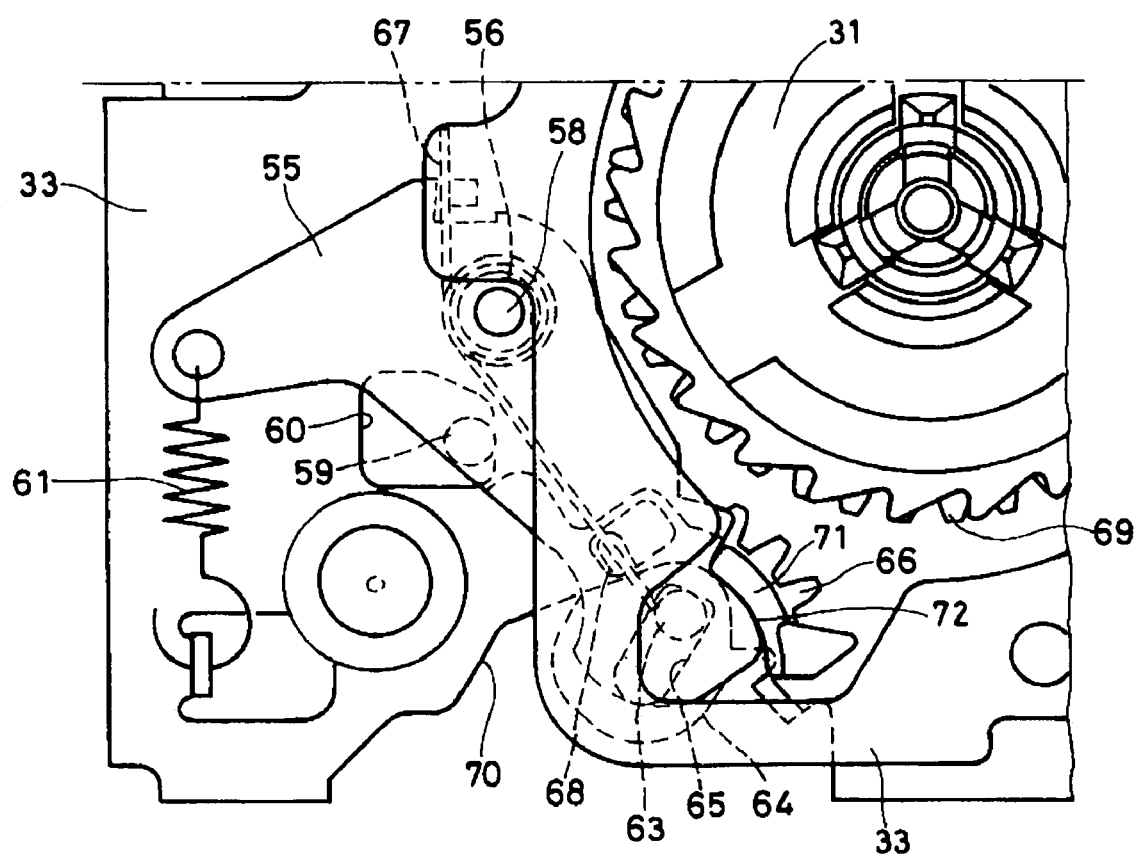
FIG. 11 is a plan view showing the operation of the S-side braking mechanism.

When the brake member 64 is swung, the projection 71 of the brake member 64 moves to the upper side of the step portion 72 of the brake arm 55, as shown in FIG. 9. Then, by the urging force of the helical spring 67, the brake member 64 receives an urging force toward the diagonally left lower part as shown by the arrow 73 in FIG. 10. Accordingly, the brake member 64 moves so that the projection 71 falls in the step portion 72 as shown in FIG. 11. At this time, the pin 63 of the brake arm 55 relatively moves in the inside of the long hole 65 of the brake member 64.

By such a movement of the brake member 64 on the brake arm 55 by the helical spring 67, the teeth 66 of the brake member 64 breaks away from the gear 69 of the reel table 31. Therefore, thereby, the brake of the reel table 31 is released.

Figure 7:
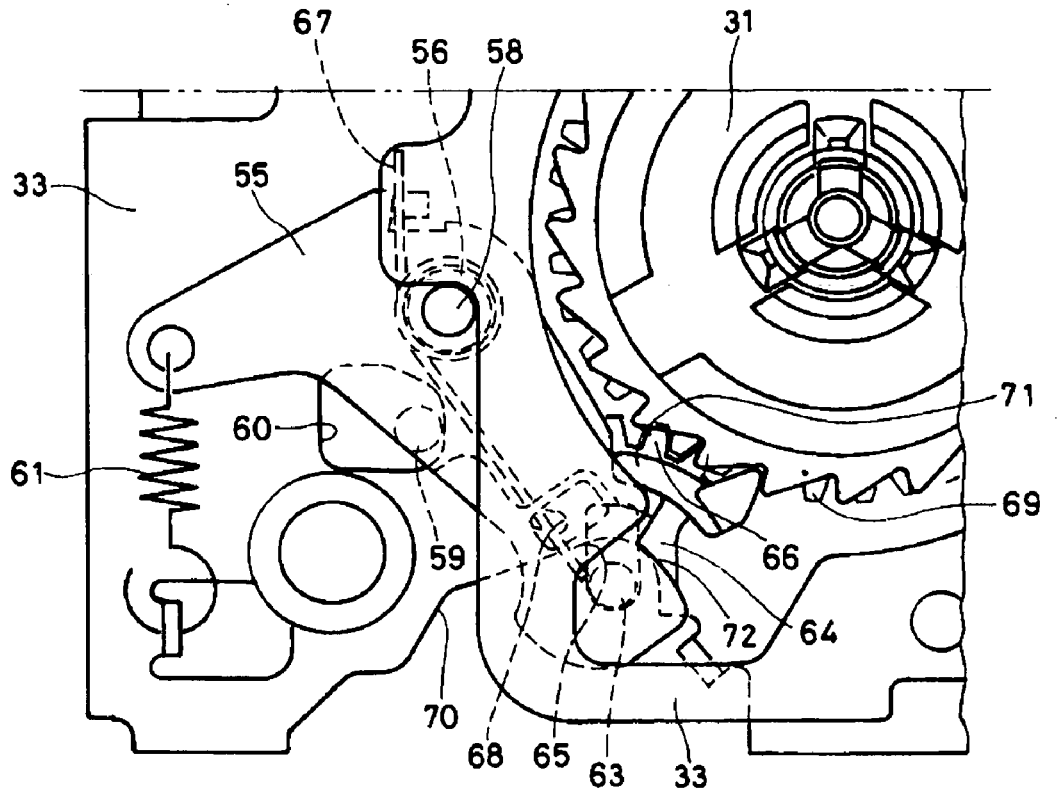
FIG. 7 is a plan view showing an arrangement of the S-side braking mechanism.

Such a release operation is performed by further driving to rotate the reel table 31 by a minute angle in the opposite direction, that is the taking-up direction, in the state where the brake arm 55 is moved to the active position shown in FIG. 7, and the release operation of the brake of the reel table 31 is performed by such an operation. Such a release operation is suitable for the brake release of the S-side reel table 31 when tape loading is performed in the state where the magnetic tape 44 does not exist in the T-side reel 42 at all.

Generally, in the case of loading of the magnetic tape 44 on the head drum 10, the magnetic tape 44 is reeled out from the T-side reel 42 engaging with the T-side reel table 32. When the magnetic tape 44 does not exist in the T-side reel 42, the magnetic tape 44 should be reeled out from the S-side reel 41. For that reason, it is necessary to release the brake of the S-side reel table 31. Therefore, as described above, the S-side reel table 31 is swung by a minute angle counter clockwise to perform the release operation of the brake. It is to be noted that the rotation of the reel table 31 by the minute angle is absorbed by a wind fastening force of the magnetic tape 44 on the S-side reel 41, and the magnetic tape 44 is not cut.

In particular, in the present embodiment, for making the braking mechanism of the S-side reel table 31 thin in the axis line direction of the reel table 31 and to be difficult to disassemble the components constituting the breaking mechanism, the VTR is configured as follows. That is, in the case where the brake in which the brake arm 55 operates by the turning on and off of the brake at the same position is composed of a plurality of components, the assembly of the brake is made to a structure combined with the pin 63 and the long hole 65, and the length of the pin 63 in the axis line direction is made longer than the thickness of the combined components of the braking mechanism, thereby making the brake arm 55 and the brake member 64 to be difficult to disassemble even after the assembly.

Here, the braking device is composed of the brake arm 55, the brake member 64 and the helical spring 67, and is assembled on the slide chassis 33, as described above. The pin 63 of the brake arm 55 is fitted in the long hole 65 of the brake member 64, and both of them are latched and held with the helical spring 67. By such a structure, it is made to be possible that the brake arm 55 performs the turning on and off of the brake according to the rotation direction of the reel table 31 in the active position shown in FIG. 7.

Here, if the brake mechanism is made to be the thin-shaped structure, the size of the pin 63 of the brake arm 55 in the axis line direction is restricted and becomes short. Accordingly, even if the brake member 64 is combined and the helical spring 67 is fitted, the brake mechanism easily disassembles because the pin 63 is short.

Figure 6:
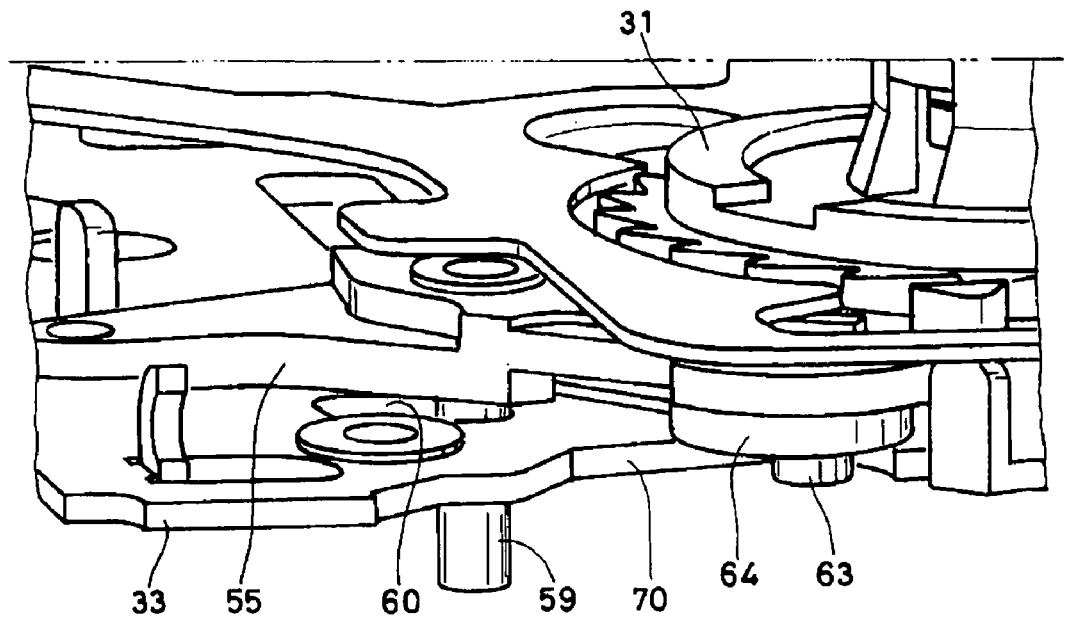
FIG. 6 is a perspective view of the main part of a slide chassis incorporating the S-side braking mechanism.

Therefore, in the present embodiment, in the structure of braking mechanism composed of the brake arm 55, the brake member 64 and the helical spring 67, which are assembled on the slide chassis 33, even if the space in the axis line direction in which the brake structure is arranged is made to be the same, the length of the pin 63 of the brake arm 55 is lengthened, and the lengthened portion of the pin 63 is received in a cut 70 formed on the rear edge of the slide chassis 33 as shown in FIGS. 6 and 7. That is, by the provision of the cut 70 in the operating range of the pin 63 on the slide chassis 33 for linear skate, even if the pin 63 is lengthened, the braking mechanism is made to be possible to operate, and the brake member 64 becomes difficult to break away to make it difficult to disassemble. Consequently, by such a structure, even if a brake mechanism is shaped to be thin and a small set, the easiness of the disassembling of the braking mechanism disposed in the side part of the S-side reel table 31 is settled, and the assembly thereof is stabilized.

(6) Operation of Brake Mechanism of T-Side Reel Table 32

Figure 12:
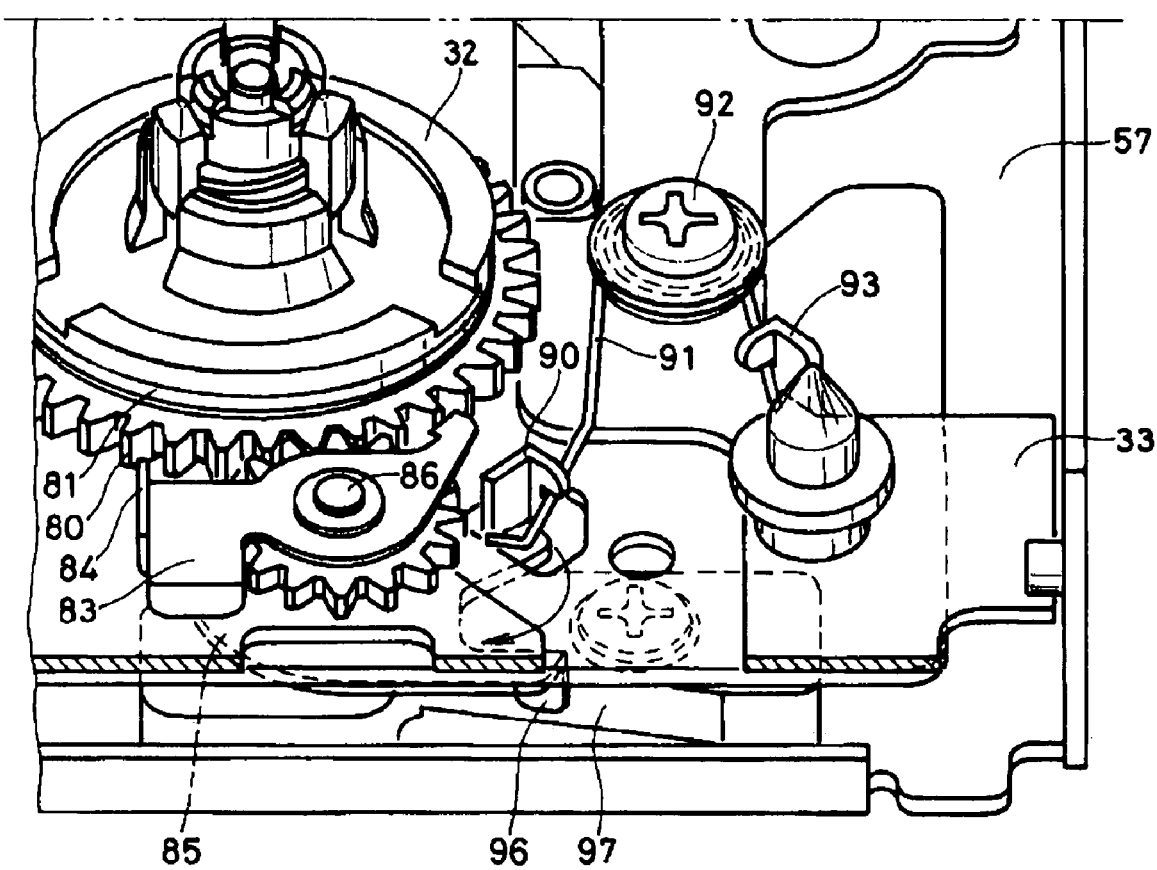
FIG. 12 is a perspective view of the main part of a T-side braking mechanism.
Figure 13:
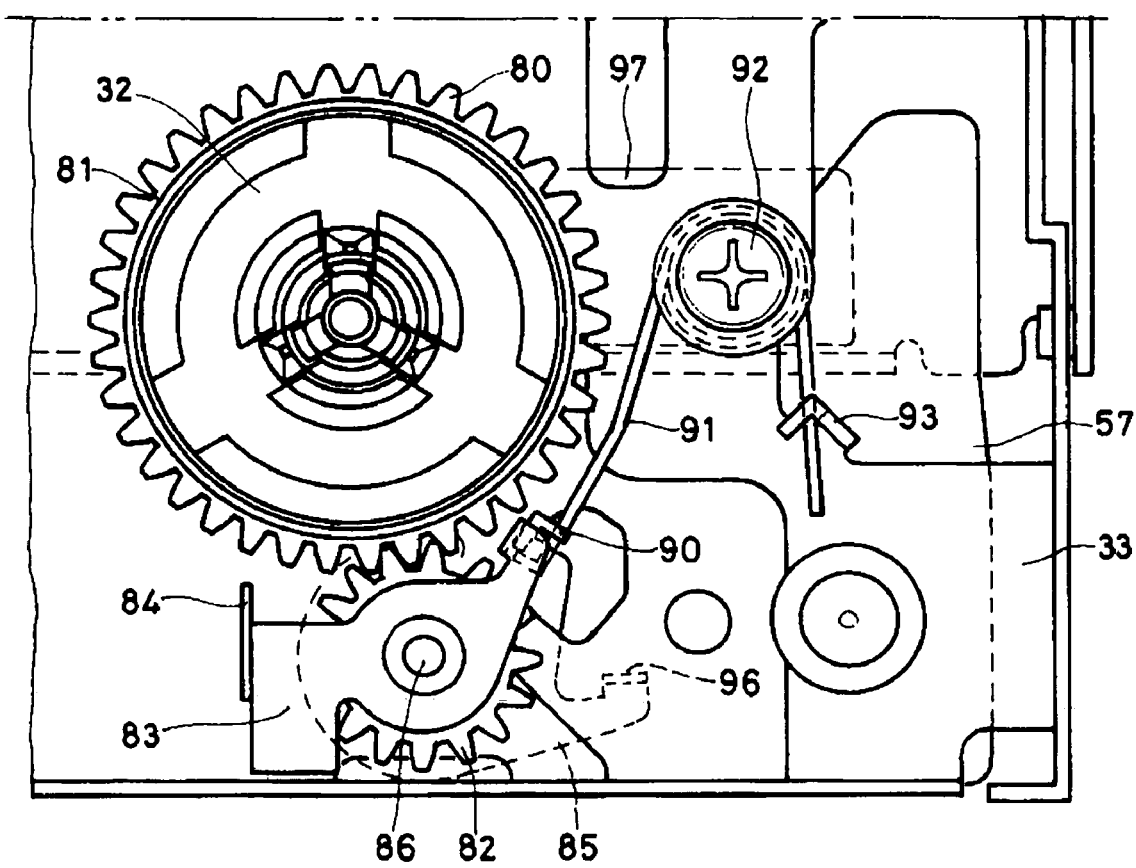
FIG. 13 is a plan view of the main part of the braking mechanism.

The brake mechanism disposed on the side part of the T-side reel table 32 is composed of the brake levers 83 disposed so as to sandwich the brake gear 82, as shown in FIGS. 12 and 13. The projecting piece 84 of the brake lever intermeshes with the gear 80 to apply brakes to the reel table 32.

Here, in the state where the slide chassis 33 has slid back, namely in the state where the slide chassis 33 has been separated from the head drum 10, the tip portion of the helical spring 91 pushes the latch piece 90 as shown in FIG. 13, and thereby coercively swing the brake holder 85 and the brake lever 83 centered around the pin 86 counterclockwise. Accordingly, the swing of the brake lever 83 in the clockwise direction is blocked, and the projecting piece 84 of the brake lever 83 is made to be impossible to engage with the gear 80, thereby restricting the brake in the release state.

Figure 14:
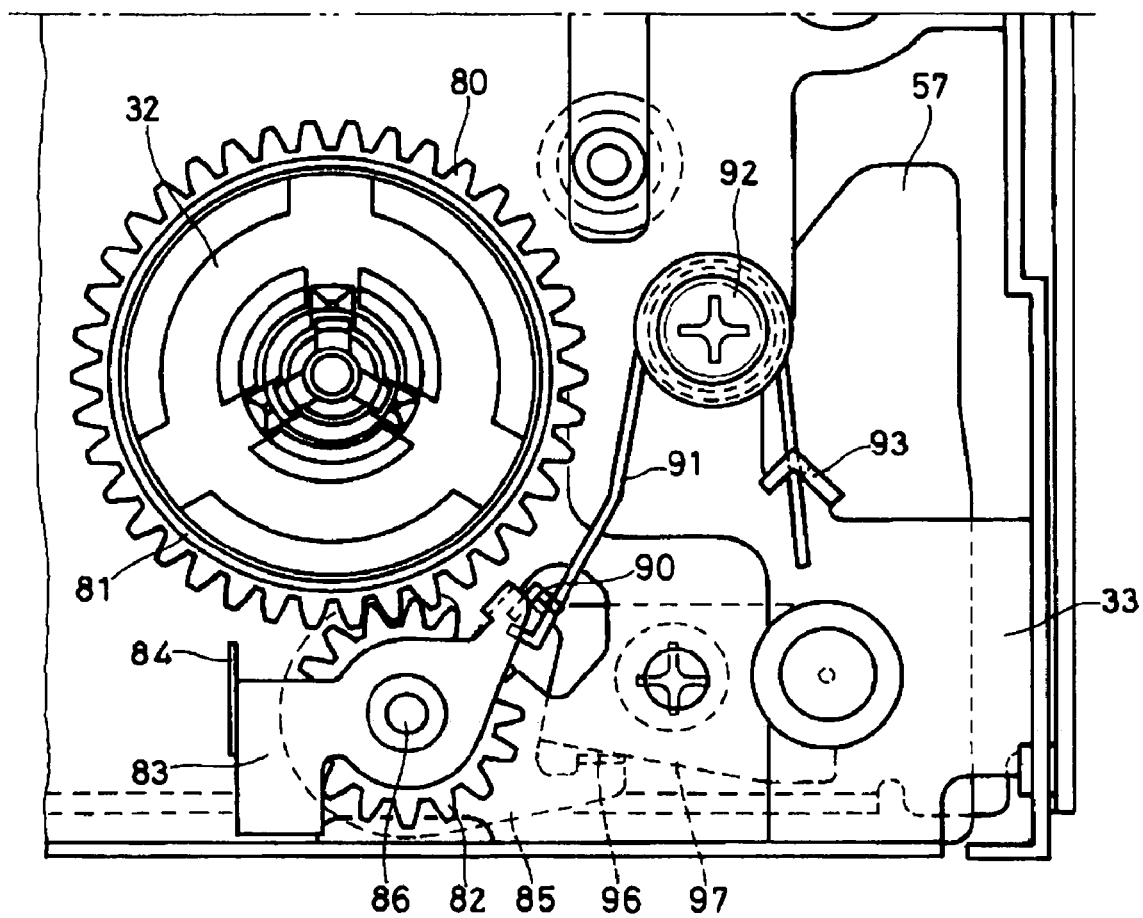
FIG. 14 is a plan view of the main part showing an operation of the T-side braking mechanism.
Figure 15:
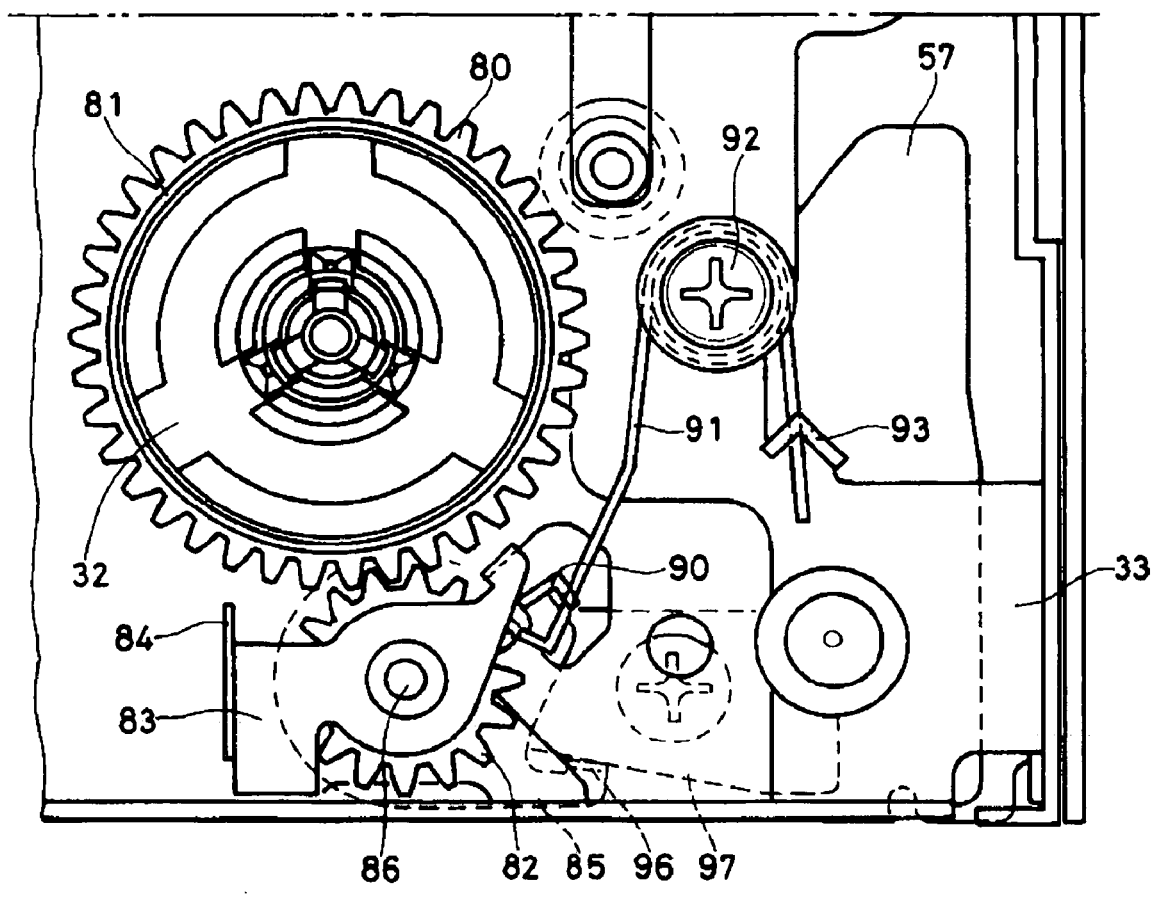
FIG. 15 is a plan view of the main part showing the operation of the T-side braking mechanism.

When the slide chassis 33 is moved in the direction of approaching the head drum 10 in the above state, as shown in FIGS. 14 and 15, the release member 97 provided on the main chassis 57 finally abuts against the bent piece 96 of the brake holder 85 as shown in FIG. 15, and thereby the release member 97 coercively swing the brake holder 85 in the clockwise direction centered around the pin 86 to hold the brake holder 85 at the position shown in FIG. 15. Consequently, the latch piece 90 of the brake holder 85 presses down the tip portion of the helical spring 91, and thereby does not make the helical spring 91 operate on the brake lever 83.

Therefore, by the above action, the brake lever 83 becomes free and can swing in any directions of both of the clockwise direction and the counterclockwise direction centered around the pin 86. That is, when a loading operation interlocking with the going movement of the slide chassis 33 has been completed, the restrict of the brake device by means of the helical spring 91 is released, and a switching operation of the brake comes to be performed according to the rotation direction of the T-side reel table 32.

Figure 16:
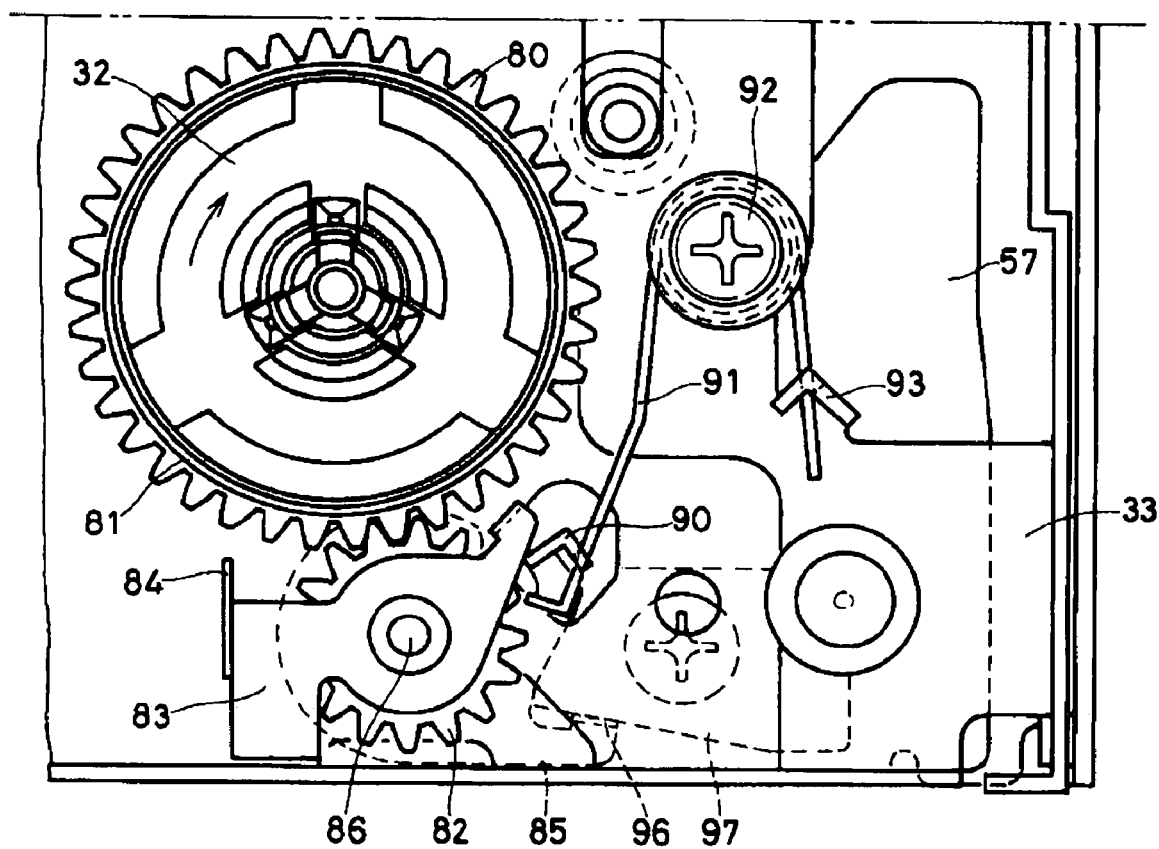
FIG. 16 is a plan view of the main part showing the operation of the T-side braking mechanism.

When the reel table 32 is driven to rotate in the taking-up direction, namely in the clockwise direction, as shown in FIG. 16, the gear 80 is driven to rotate in the clockwise direction through the magnet clutch 81. Accordingly, the brake gear 82 engaging with the gear 80 is driven to rotate counterclockwise centered around the pin 86. Therefore, the brake lever 83 sandwiching the brake gear 82 is urged to swing counterclockwise, and the projecting piece 84 is separated from the gear 80, as shown in FIG. 16. Consequently, the rotation of the gear 80 becomes free in this case, and the gear 80 rotates together with the T-side reel table 32 through the magnet clutch 81 to be in the state of a brake off.

On the other hand, when the T-side reel table 32 is driven to rotate counterclockwise, namely when the reel table 32 is inversely rotated, as shown in FIG. 17, the gear 80 combined with the reel table 32 through the magnet clutch 81 also rotates in the same direction. Accordingly, the brake gear 82 engaging with the gear 80 rotates clockwise. Therefore, the brake lever 83 assembled so as to sandwich the brake gear 82 from the upper side and the lower side swings in the clockwise direction centered around the pin 86, and the projecting piece 84 engages with the gear 80.

Consequently, the gear 80 becomes impossible to rotate, and only the T-side reel table 32 rotates counterclockwise while making the magnet clutch 81 slip. That is, the T-side reel table 32 is driven to rotate while bearing the magnet clutch 81 as a load, and the brake becomes an on-state.

In particular, the braking mechanism of the T-side reel table 32 in the VTR of the present embodiment has the mechanism for the release of the restrict which is a structure advantageous to the miniaturization of a mechanical deck. That is, the slide chassis 33 is provided in the state movable in the directions of approaching and separating from the head drum 10 on the main chassis 57 fixing the head drum 10 thereon, and the slide chassis 33 attaches the tape cassette 40 thereto. On the slide chassis 33, there are disposed the T-side reel table 32 together with the S-side reel table 31, the braking mechanism composed of the brake lever 83 making the operation turn on and off according to the rotation direction of the T-side reel table 32, and the release means for coercively releasing the braking during the movement of the slide chassis 33, namely the helical spring 91.

With the aim of lessening the depth size in the directions of approaching and separating from the head drum of the VTR as shown in FIG. 12, the slide chassis 33 moving so as to make the tape cassette 40 approach the head drum 10 disposed on the main chassis 57 is provided. On the slide chassis 33, the S-side reel table 31 and the T-side reel table 32 holding the S-side reel 41 and the T-side reel 42 in the tape cassette 40, respectively, are provided, and the brake gear 82 always intermeshing with the gear 80 of the T-side reel table 32, and the brake lever 83 driven by the frictional torque of the rotation of the brake gear 82 are disposed.

As described above, when the reel table 32 rotates counterclockwise as shown in FIG. 17, the brake gear 82 rotates in the clockwise direction, and the projecting piece 84 of the brake lever 83 interlocks with the gear 80 of the reel table 32 by the frictional torque of the brake gear 82 to suppress the rotation of the reel table 32 thereby. Moreover, when the reel table 32 rotates in the clockwise direction, the brake gear 82 is rotated counterclockwise and the brake by the brake lever 83 is released, as shown in FIG. 16.

Here, only when the magnet tape 44 is sent to the opposite direction in the case where the brake lever 83 is disposed in the side part of the T-side reel table 32, the projecting piece 84 of the brake lever 83 comes to engage with the gear 80 of the reel table 32, as shown in FIG. 17. Moreover, the T-side reel table 32 has a two-layer structure of the gear 80 and the main part holding the tape cassette, and is made to be assembled vertically by the magnetic force of the magnet clutch 81 intervening between them. Consequently, the braking force of the magnet clutch 81 becomes a limiter force or a braking force in case of pulling out the magnetic tape 44 in the opposite direction.

However, when the slide chassis 33 is moved in order to make the tape cassette 40 approach the rotating head drum 10, the magnetic tape 44 is wound around the head drum 10 simultaneously, so that when the magnetic tape 44 is pulled out from the T-side reel 42 of the tape cassette 40, the T-side reel table 32 also rotates. If the projecting piece 84 of the brake lever 83 interlocks with the gear 80 of the reel table 32 at this time as shown in FIG. 17, a resistance is produced when the magnetic tape 44 is pulled out from the T-side reel 42. Accordingly, it is necessary not to make the brake lever 83 intermesh with the gear 80 coercively.

Therefore, conventionally, release means composed of a brake cam is disposed on the main chassis 57, and the coercive release of the brake lever 83 is performed by the cam portion. However, according to such a structure, it is necessary to form the cam portion for release on the main chassis 57 over the whole length of the moving stroke of the slide chassis 33, which is disadvantaged to miniaturization.

Accordingly, in the present embodiment, during the movement of the slide chassis 33, the brake holder 85 provided on the slide chassis 33 is coercively swung counterclockwise centered around the pin 86 by the helical spring 91 as shown in FIGS. 13 and 14, and the brake lever 83 is pressed to be restricted coercively. When the slide chassis 33 has performed a going movement operation completely, the state thereof is changed from that shown in from FIG. 14 to that shown in FIG. 15, and the bent piece 96 of the brake holder 85 is pressed by the release member 97 provided on the main chassis 57. As a result, the brake holder 85 is swung in the clockwise direction centered around the pin 86, and the restriction of the brake lever 83 is released to be switched to a free state. Consequently, a small-sized brake structure can be realized independent of the moving amount of the slide chassis 33 by such a release mechanism composed of the release member 97 provided on the main chassis 57.

Although the present invention has been described with regard to one shown embodiment, the invention of the present application is not limited to the embodiment described above, but various kinds of alterations can be performed within a scope of the technical idea of the invention included in the present application. For example, although the embodiment described above is related to a VTR, the invention of the present application can be widely applied also to the recording and reproducing apparatus of the helical scanning system for the record of audio signals and data other than the video signals.

INDUSTRIAL APPLICABILITY

The main invention of the present application is a recording and reproducing apparatus performing recording and/or reproducing in conformity with a helical scanning system, by helically winding a tape-shaped recording medium around a head drum and by helically scanning the tape-shaped recording medium with a rotating head, characterized in that: a brake arm is disposed in proximity to a supply-side reel table with which a supply-side reel reeling out the tape-shaped recording medium engages; a brake member is attached on the brake arm in a state where the brake member can swing on the brake arm and a swinging center thereof can move, the brake member is urged by an urge member incorporated on the brake arm in a releasing direction; and when the supply-side reel table is driven to rotate in a direction taking up the tape-shaped recording medium, the brake member moves the center thereof and separates from the supply-side reel table by the urge member to release a brake.

Consequently, according to such a configuration, by rotating the supply-side reel table in the direction taking up the tape-shaped recording medium, the brake member moves its center to separate from the supply-side reel table by the urge member to release the brake. Therefore, only by driving the supply-side reel table to rotate in the direction taking up the brake member in the active state, releasing becomes possible. Thus, only by the rotation of the reel table, it is possible to switch the brake between the active state thereof and the inactive state thereof.

Another main invention of the present application is a recording and reproducing apparatus performing recording and/or reproducing in conformity with a helical scanning system, by helically winding a tape-shaped recording medium around a head drum and by helically scanning the tape-shaped recording medium with a rotating head, characterized in that: a supply-side reel table and a take-up side reel table, with which a supply-side reel reeling out the tape-shaped recording medium and a take-up side reel taking up the tape-shaped recording medium engage, respectively, are mounted on a slide chassis capable of approaching the head drum and separating from the head drum; a brake lever is disposed in proximity to the take-up side reel table, with which the take-up side reel taking up the tape-shaped recording medium engages; the brake lever releasing braking when the reel table rotates in a taking-up direction and performing an braking operation when the reel table rotates in an opposite direction to the taking-up direction; restricting means for restricting the brake lever in an inactive state on the slide chassis is provided, a release member is provided on a main chassis, on which the head drum is mounted, and restriction of the brake lever by the restricting means is released by the release member when the slide chassis moves to a head drum side.

Consequently, by such a configuration, when the slide chassis has moved to the head drum side, the restriction of the brake lever is released by the release member provided on the main chassis, and as a result the release operation by a small-sized release member can be realized independent of the movement amount of the slide chassis. Therefore the miniaturization of the braking mechanism is achieved.

The invention claimed is:

1. A recording and reproducing apparatus performing recording and/or reproducing according to a helical scanning system, in which a tape-shaped recording medium is helically wound around a head drum and scanned with a rotating head, characterized in that:
   a brake arm is disposed in proximity to a supply-side reel table with which a supply-side reel reeling out the tape-shaped recording medium engages, a brake member that includes a non-circular hole for coupling to a pin on the brake arm such that the brake member is swingable about the pin with a swinging center that is movable within the hole, the brake member is urged by an urging member incorporated on the brake arm in a brake releasing direction; and
   when the supply-side reel table is driven to rotate in a direction to take up the tape-shaped recording medium, the brake member moves to a center of the supply-side reel table and is separated from the supply-side reel table by the urging member to release the brake member.

2. The recording and reproducing apparatus according to claim 1, characterized in that:
   the brake member moves in the releasing direction when the supply-side reel table is driven to rotate in a taking-up direction in a state where the brake arm is located at an active position and the supply-side reel table receives a braking force from the braking member.

3. The recording and reproducing apparatus according to claim 1 or 2, characterized in that:
   the brake member moves in the releasing direction when the supply-side reel table is driven to rotate through a predetermined angle in the taking-up direction at a time of starting to load the tape-shaped recording medium on the head drum in a state where the tape-shaped recording medium is not taken up by a take-up side reel engaging a take-up side reel table.

4. The recording and reproducing apparatus according to claim 1, characterized in that:
   the brake arm is mounted together with the supply-side reel table and the take-up side reel table on a slide chassis capable of approaching and separating from the head drum; and a pin supporting the brake member on the brake arm is located at a relieved edge of the slide chassis.

5. The recording and reproducing apparatus according to claim 4, characterized in that:
   the pin supporting the brake member is received in a concave cut formed on an edge of the slide chassis on a side opposite to the head drum.

6. A recording and reproducing apparatus performing recording and/or reproducing according to a helical scanning system, by helically winding a tape-shaped recording medium around a head drum and by helically scanning the tape-shaped recording medium with a rotating head, characterized in that:
   a supply-side reel table and a take-up side reel table, with which a supply-side reel reeling out the tape-shaped recording medium and a take-up side reel taking up the tape-shaped recording medium engage, respectively, are mounted on a slide chassis capable of approaching and separating from the head drum;
   a brake lever is disposed in proximity to the take-up side reel table with which the take-up side reel taking up the tape-shaped recording medium engages, the brake lever releases braking when the reel table rotates in a taking-up direction and performing a braking operation when the reel table rotates in an opposite direction to the taking-up direction; and
   restricting means for restricting the brake lever in an inactive state is mounted on the slide chassis, a release member is mounted on a main chassis on which the head drum is mounted, and restriction of the brake lever by the restricting means is released by the release member when the slide chassis moves to a head drum side, the restricting means continually applying a force to the brake lever, and the brake lever being released from restriction when a force applied by the release member overcomes the force applied by the restricting means.

7. A recording and reproducing apparatus according to claim 6, characterized in that:
   the take-up side reel table is provided with a magnet clutch and a gear; and the brake lever brakes the reel table through the magnet clutch when the brake lever engages with the gear.

8. A recording and reproducing apparatus according to claim 7, characterized in that:
   a brake gear engaging with the gear of the reel table is provided; the brake gear and the brake lever engage with each other with friction; a rotation of the reel table is transmitted to the brake lever through the gear and the brake gear; and braking and releasing of the brake lever are performed according to a rotation direction of the reel table.

9. A recording and reproducing apparatus according to claim 8, characterized in that:
   the brake lever and the brake gear are mounted on the slide chassis through a brake holder; and the brake holder abuts against the release member on the main chassis to release the restriction of the brake lever by the restricting means when the slide chassis moves to the head drum side.

10. A recording and reproducing apparatus according to claim 9, characterized in that:
    the brake lever is urged in a direction in which the brake lever is turned to be in the inactive state by the restricting means through the brake holder; and the release member swings the brake holder the releasing direction against the restricting means.

11. A recording and reproducing apparatus according to claim 9, characterized in that:

the restricting means is a helical spring supported by a supporting member on the slide chassis; and the brake lever is urged to swing in a direction to an inactive state by a free end of the helical spring.

12. A recording and reproducing apparatus performing recording and/or reproducing according to a helical scanning system, by helically winding a tape-shaped recording medium around a head drum and by helically scanning the tape-shaped recording medium with a rotating head, characterized in that:

a tape cassette wound with the tape-shaped recording medium therein is moved in a direction approaching the head drum by a slide chassis to perform the recording and/or the reproducing with the tape-shaped recording medium pulled out from the tape cassette;

a reel brake for braking a reel wound with the tape-shaped recording medium in the tape cassette is provided, the reel brake performing a braking operation when pulling out the tape-shaped recording medium from the reel, the reel brake releasing the braking operation when taking up the tape-shaped recording medium;

restricting means for restricting the reel brake by coercively releasing the reel brake during a movement of the slide chassis equipped with the tape cassette provided on the slide chassis, the restricting means continually applying a force to the reel brake; and release means for releasing restriction by the restricting means when the slide chassis equipped with the tape cassette moves to a head drum side provided on a main chassis mounted with the head drum, the reel brake being released from restriction when a force applied by the release means overcomes the force applied by the restricting means.

13. A recording and reproducing apparatus according to claim 12, characterized in that:

the reel brake performs the braking operation and the releasing the brake operation according to a rotation direction of the reel.

14. A recording and reproducing apparatus according to claim 12, characterized in that:

the reel brake is disposed in proximity to a take-up side reel table.

* * * * *